US006754390B2

(12) United States Patent
Dobeck

(10) Patent No.: US 6,754,390 B2
(45) Date of Patent: Jun. 22, 2004

(54) FUSING OUTPUTS FROM MULTIPLE DETECTION/CLASSIFICATION SCHEMES

(75) Inventor: Gerald Dobeck, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 558 days.

(21) Appl. No.: 09/731,397

(22) Filed: Dec. 1, 2000

(65) Prior Publication Data

US 2002/0110279 A1 Aug. 15, 2002

(51) Int. Cl.$^7$ ................................................. G06K 9/62
(52) U.S. Cl. ...................................................... 382/228
(58) Field of Search ................................. 382/224, 228, 382/190

(56) References Cited

U.S. PATENT DOCUMENTS 6,125,194 A * 9/2000 Yeh et al. .................... 382/132

FOREIGN PATENT DOCUMENTS

EP 621556 A2 * 10/1994 ............ G06K/09/68

OTHER PUBLICATIONS

Huang et al. "Combination of Multiple Classifiers with Measurement Values." Proc. 2nd Int. Conf. on Document Analysis and Recognition, Oct. 22, 1993, pp. 598–601.*

Khotanzad et al. "Hand Written Digit Recognition Using BKS Combination of Neural Network Classifiers." Proc. of the IEEE Southwest Symp. on Image Analysis and Interpretation, Apr. 21, 1994, pp. 94–99.*

Kundu et al. "An Integrated Hybrid Neural Network and Hidden Markov Model Classifier for Sonar Signals." IEEE Trans. on Signal Processing, vol. 45, No. 10, Oct. 1997, pp. 2566–2570.*

Xiao et al. "Neural Network Classification with IFSAR and Multispectral Data Fusion." IEEE Int. Geoscience and Remote Sensing Symposium Proceedings, vol. 3, Jul. 6, 1998, pp. 1327–1329.*

Sanderson et al. "Multi–Modal Person Verification System Based on Face Profiles and Speech." Proc. of the 5$^{th}$ Int. Symp. on Signal Processing and Its Applications, vol. 2, Aug. 22, 1999, pp. 947–950.*

Ciany et al. "Computer Aided Detection/Computer Aided Classification and Data Fusion Algorithms for Automated Detection and Classification of Underwater Mines." Oceans 2000 MTS/IEEE Conference and Exhibition, vol. 1, Sep. 11, 2000, pp. 277–284.*

* cited by examiner

*Primary Examiner*—Jon Chang
(74) *Attorney, Agent, or Firm*—Harvey A. Gilbert; Donald G. Peck

(57) ABSTRACT

A method of fusing outputs from multiple detection/classification (D/C) schemes is provided. Each of a plurality of D/C schemes provides output scores for an area of interest. Each output score corresponds to a detected object at a known location in the area of interest and indicates a degree of confidence with respect to a detection of a target at the known location. Each output score is normalized and then categorized into a group based on the known location associated therewith. The normalized output scores for each group are fused in accordance with a fusion rule.

9 Claims, 2 Drawing Sheets

FUSING OUTPUTS FROM MULTIPLE DETECTION/CLASSIFICATION SCHEMES

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to the detection and classification of objects in an image, and more particularly to a method of fusing outputs from multiple detection and classification schemes in order to reduce false alarms.

BACKGROUND OF THE INVENTION

Many minehunting sonar systems employ high-resolution side-looking sonars that are effective at detecting and classifying bottom-located sea mines in the complex littoral environment. However, these shallow-water regions are also filled with natural, biologic and man-made objects that generate mine-like sonar returns which, in turn, cause many false detection alarms. Accordingly, there has been much research and development of detection and classification sonar processing schemes that can reduce alarms while still maintaining a high probability of mine detection and classification.

Since much of the research and development of detection and classification schemes is carried out by independent or even competitive entities, the various detection and classification schemes generally involve significantly different technical approaches. Here, the phrase "significantly different approaches" means that the algorithms used by the schemes are based on different mathematical, geometrical and statistical theories. Each approach effectively constrains its algorithms (i.e., sequence of data processing steps) by predisposing (or prejudicing) the way it views the data representing the object it is trying to classify. This results in feature spaces and class boundaries that are constructed in very different ways by each algorithm. Thus, each algorithm is keying on substantially different characteristics of mines so that the ultimate performance of a given sensor in a given environment is predicated on the choice of a detection and classification scheme.

SUMMARY OF THE INVENTION

Accordingly, it is an object of the present invention to reduce false alarms output by target detection and classification schemes.

Another object of the present invention is to take advantage of the different technical approaches used by a variety of detection and classification schemes in order to reduce false alarms.

A still further object of the present invention is to provide a method of detection and classification that makes simultaneous use of multiple detection and classification schemes.

Still another object of the present invention is to provide a method of reducing the number of false detection alarms produced by a sonar system operating in a littoral region.

Other objects and advantages of the present invention will become more obvious hereinafter in the specification and drawings.

In accordance with the present invention, a method of fusing outputs from multiple detection/classification (D/C) schemes is provided. Each of a plurality of D/C schemes provides output scores for an area of interest. Each output score corresponds to a known location in the area of interest and indicates a degree of confidence with respect to a detection of a target at the known location. The output scores are normalized to form normalized output scores associated with each of the D/C schemes. Each of the normalized output scores is categorized into a group based on the known location associated therewith. The normalized output scores for each group are fused in accordance with a fusion rule.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
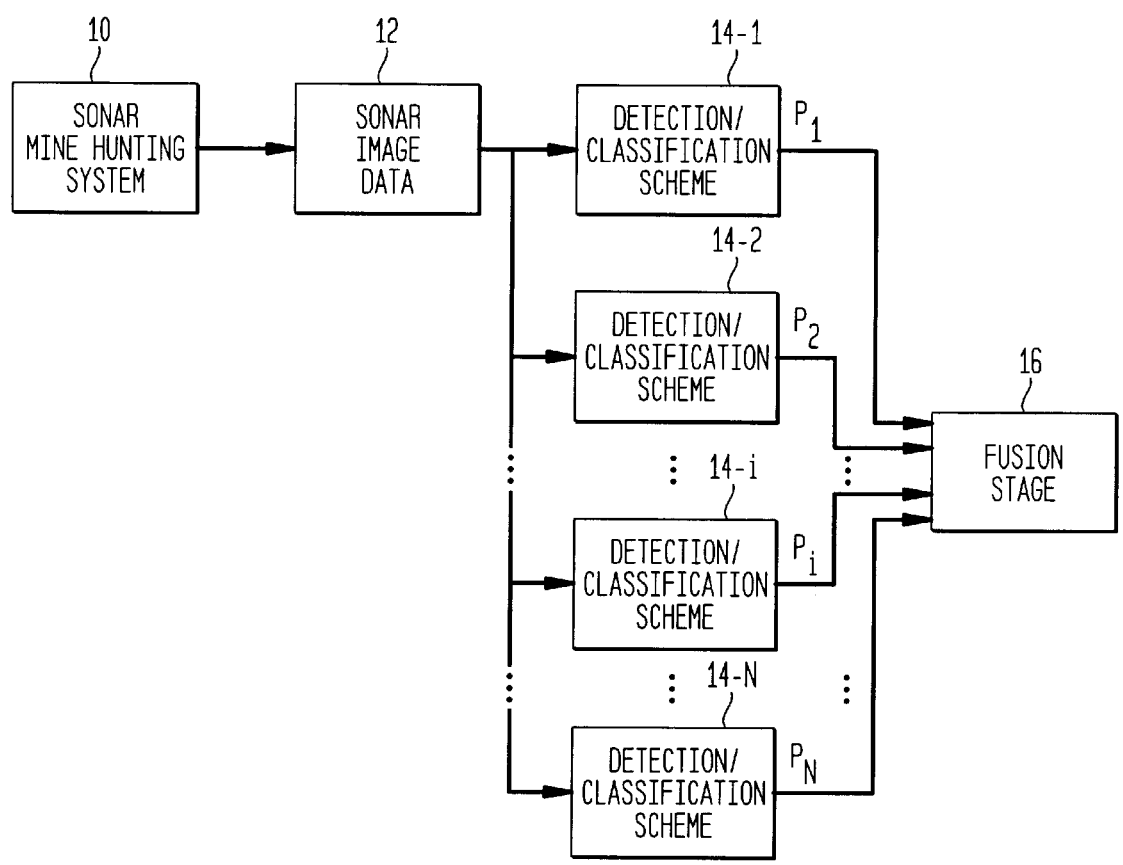
FIG. 1 is a block diagram depicting a sonar system employing multiple detection and classification (D/C) schemes/algorithms, the outputs of which are to be fused by the present invention.

The present invention reduces false detection alarm rates by fusing outputs from a number of detection and classification schemes. By way of illustrative example, the present invention will be described for use by a minehunting sonar system that is attempting to detect and classify various underwater objects either as "mine-like" from sonar imagery data collected over a surveyed area or "non-mine-like". Specifically, the present invention is a method of reducing the number of false "mine-like" detections. However, it is to be understood that the present invention can be used in other fields in which a plurality of different detection and classification (D/C) schemes are available. Such fields include medical diagnostics where internal images of a body can be processed by a variety of D/C schemes to provide notification of suspect areas in an image. The internal images could be x-ray images, CAT scan images, mammographic images, magnetic resonance images, etc.

The present invention is predicated on the belief that a substantial benefit will result when the outputs from a plurality of D/C schemes are fused. It is assumed that the schemes are based on significantly different technical approaches, i.e., the D/C schemes have been developed based on different mathematical, geometrical and statistical theories. As a result, each D/C scheme is assumed to constrain its underlying formulation which predisposes or prejudices the way it views the data it is trying to classify. Accordingly, feature spaces and class boundaries will be constructed in very different ways by each D/C scheme as each scheme's underlying algorithm focuses on substantially different characteristics of the objects being searched for, e.g., mine-like signatures in sonar imagery in the illustrative example.

When a single algorithm's parameters are set for a high probability of detection, it usually follows that the algorithm's false (detection) alarm rate is also high. This is especially true when a D/C scheme operates in a new environment that is different from the environments used to develop and train the D/C scheme's algorithm. Further, research suggests that when algorithms are predicated upon significantly different technical approaches, most false alarms are not common among them while detections of most "mine-like" objects are common. This suggests that an AND-ing type of fusion of algorithm outputs would be beneficial in reducing the number of false alarms.

The present invention can be used to fuse the outputs of N different D/C schemes. It is assumed that the output of the i-th D/C scheme for some object in an area of interest, e.g., a sonar image, is $P_i$ where $P_i$ is a non-negative quantity or score that indicates the degree to which the particular D/C scheme believes the detected object is mine-like (or, in general, target-like). Thus, $P_i$ will be referred to herein as the "output score" for the i-th D/C scheme. The form of $P_i$ can be quite different for different algorithms. For example, $P_i$ could represent a likelihood ratio, a fuzzy-logic based score, a conditional probability (i.e., probability that the object is a mine given features extracted from the sonar image by the scheme's D/C algorithm), etc.

Prior to processing by the present invention, data from an image (scene) is processed independently by N different D/C schemes. Each D/C scheme detects objects of interest in the image and assigns each detected object an output score $P_i$. Next, each scheme produces a list of all detected objects within the image with their corresponding output scores and locations in terms of image coordinates. The N lists from the N different D/C schemes are inputs for the present invention.

Briefly, the present invention has five processing steps that are executed sequentially. The first step is the "normalization step" where each output score $P_i$ is mapped to a "normalized output score" $C_i$. The second step is the "coregistration step" where it is determined which objects among the N lists are the same. That is, which objects have been detected by one or more of the D/C schemes. In the coregistration step, the N lists of detected objects are grouped (or clustered) into a single list of clustered groups. A clustered group of objects will be referred to as a single "grouped object." The third step is the "feature vector step" where a feature vector for each grouped object is generated from the normalized output scores of the objects that make up the group. The fourth step is the "fusion step" where the feature vector of each grouped object is used to determine a fusion output score z. The fifth and final step is the "decision step" where a grouped object is declared "mine-like" if z is greater than a specified threshold H, otherwise it is declared "non-mine-like." The motivation and details of these five steps are described in further detail below.

Figure 2:
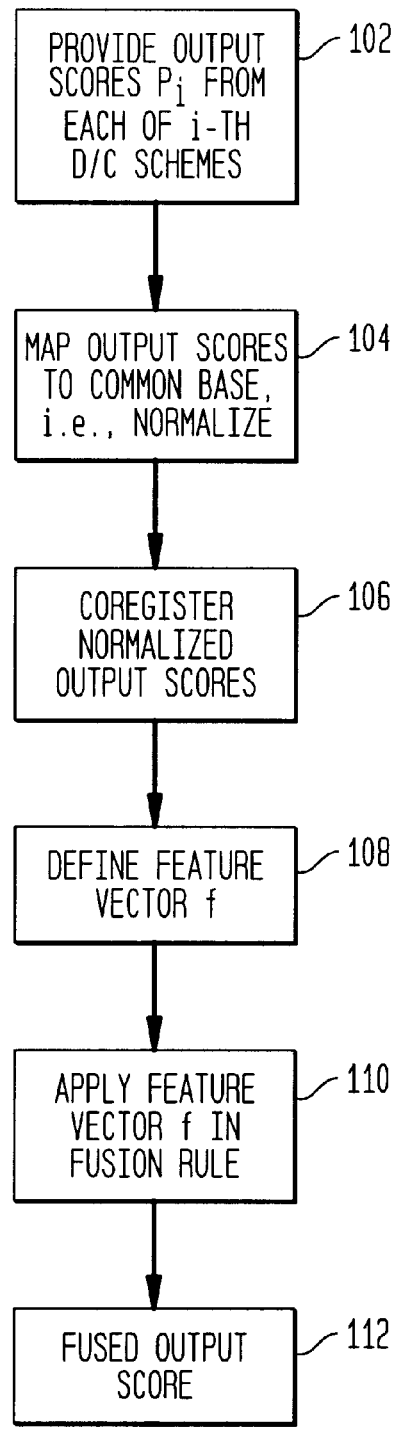
FIG. 2 is a flow chart outlining the method steps of the present invention.

To illustrate the present invention, refer now to the drawings and more particularly to FIG. 1. In the illustrated example, it is assumed that the objective is to detect mines in an underwater area of interest using a sonar minehunting system 10. Sonar minehunting system 10 produces sonar mission data 12 that is essentially a series of sonar images of an area of interest in the water. The same sonar images are provided to N different D/C schemes 14-1, 14-2, . . . , 14-i, . . . , 14-N, each of which has its own underlying D/C algorithm independently operating on sonar image data 12. The output scores $P_1, P_2, \ldots, _iP, \ldots, _NP$ are provided to an output fusion stage 16 implemented in accordance with the present invention. The steps of fusion stage 16 are outlined in the flow chart depicted in FIG. 2.

At step 102, the $P_i$'s are obtained from multiple algorithms. Before the $P_i$'s can be fused, they are mapped or normalized at step 104 to a common base referred to herein as $C_i$'s or the "normalized output scores." Each normalized output score $C_i$ represents a normalized degree of confidence that a particular detection is mine-like. The importance of mapping or normalizing the $P_i$'s to $C_i$'s is illustrated by noting that a condition $P_1 > P_2$ does not imply that Algorithm 1 considers an object more mine-like than Algorithm 2. This is because $P_1$ and $P_2$ may be based on different scoring mechanisms and, therefore, cannot be directly compared to one another. For example, $P_1$ could be likelihood ratio that varies from zero to infinity while $P_2$ could be a conditional probability varying only between 0 and 1. Therefore, the conversion from $P_i$ to $C_i$ normalizes the algorithm outputs such that, for this 2-algorithm example, a condition $C_1 > C_2$ would imply that Algorithm 1 does indeed consider the detected object more mine-like than Algorithm 2.

The mapping or normalizing of $P_i$ to $C_i$ can be accomplished in a variety of ways, two of which will be described herein. Each mapping scheme is monotonic and maps $P_i$ to $C_i$ where $_i$ varies from 0 to $P_{iMAX}$, the maximum value for $P_i$, and $C_i$ varies from 0 to 1.

Before these mappings are described, there is a function $Pd_i(T)$ that is used in both mappings that will be defined now. $Pd_i(T)$, which varies between 0 and 1, is the probability detection function associated with the i-th D/C scheme. $Pd_i(T)$ is defined as the expected fraction of targets (mines) detected using the detection rule: "An object is detected as a target (mine) if its score $P_i$ is greater than T." In the art, it is common for the Pd(T) function to be known for existing D/C schemes. Usually it can be obtained from two sources. First, $Pd_i(T)$ can often be obtained in open technical publications or reports written by the inventor of i-th D/C scheme. Second, $Pd_i(T)$ can be generated from training data by users of this invention who are skilled in the art and have access to the i-th D/C scheme's algorithm. Therefore, for purposes of the present invention, it will be assumed that the function $Pd_i(T)$ is available.

The first mapping scheme that is used in the present invention is predicated on the following relationship for $C_i$:

$$C_i = \frac{P_i}{P_i + K(P_{iMAX} - P_i)} \quad (1)$$

where $$K = \frac{T_i}{P_{iMAX} - T_i}. \quad (2)$$

Note that if $P_{iMAX}$ is infinity, equation (1) reduces to $$C_i = \frac{P_i}{P_i + T_i} \quad (3)$$

Equations (1), (2) and (3) imply that the first mapping scheme has the following characteristics:

1) $P_i=0$ is mapped to $C_i=0$,
2) $P_i=P_{iMAX}$ is mapped to $C_i=1$,
3) $P_i=T_i$ is mapped to $C_i=0.5$, and
4) $C_i$ increases monotonically as $P_i$ increases.

To complete the definition of this mapping, the user of the present invention must select values for $T_i$. This is done by first specifying a fixed probability value A (for example A=0.9). Then, the $T_i$'s are defined such that $Pd_i(T_i)=A$ where, as stated earlier, the function $Pd_i(T)$ is assumed known.

A second mapping scheme that can be used in the present invention is predicated on the following relationship for $C_i$:

$$C_i = \frac{1 - Pd_i(P_i)}{1 - Pd_i(P_i) + KPd_i(P_i)} \quad (4)$$

where K=(1−A)/A, and

A is a probability value specified by the user of the present invention (e.g., A=0.9).

Equation (4) implies that the second mapping has the following characteristics:

1) $P_i$ for which $Pd_i(P_i)=1$ is mapped to $C_i=0$,
2) $P_i$ for which $Pd_i(P_i)=A$ is mapped to $C_i=0.5$,
3) $P_i$ for which $Pd_i(P_i)=0$ is mapped to $C_i=1$, and
4) $C_i$ monotonically increases with respect to $P_i$ because $Pd_i(P_i)$ is monotonically decreasing with respect to $P_i$.

Recall that each of D/C schemes 14-1, . . . , 14-N operates independently on the image data and provides output scores $P_i$ of the detected objects, together with their corresponding locations within the image (e.g., an (x, y) location, grid location, quadrant location, etc). These locations are used in step 106 of the fusion process (see FIG. 2) where the normalized output scores $C_i$ are coregistered or grouped based on their locations in the image data.

Coregistration is complicated by the fact that the estimates of the same object's location from different D/C schemes, in general, will be somewhat different. It is the objective of the coregistration stage to "group" the detections from the different D/C schemes that correspond to the same objects and to generate a list of "grouped" detections. That is, coregistration step 106 uses the location of each $C_i$ to determine which "detections" refer to the same object. Coregistration is accomplished by grouping detections from the different D/C schemes based on proximity, so that detections that are sufficiently close (as measured by a distance metric) are declared to be detections of the same object. The choice of distance metric can be any of the well known metrics such as a simple Euclidean distance metric, a block-type distance metric, etc. The choice of distance metric used during coregistration step 106 is not a limitation of the present invention.

Coregistration step 106 assigns to each of the detections a particular group where the number of possible groups is $2^N-1$ where N is the number of D/C schemes being used. Each group indicates which combination of algorithm(s) detected a given object. Foe example, if three D/C schemes are used (i.e., N=3), there are 7 possible groups where GROUP 1 is for objects detected by Algorithm 1 only;
GROUP 2 is for objects detected by Algorithm 2 only;
GROUP 3 is for objects detected by Algorithm 3 only;
GROUP 4 is for objects detected by Algorithms 1 and 2 only;
GROUP 5 is for objects detected by Algorithms 1 and 3 only;
GROUP 6 is for objects detected by Algorithms 2 and 3 only;
GROUP 7 is for objects detected by Algorithms 1, 2 and 3 only.

Thus, a given detected object will be associated with a specific group of $C_i$'s. For clarity, the term "grouped detection" will refer to a coregistered group.

The $C_i$'s, associated with a grouped detection, are the basis for the features which will be used in the fusion process. A set of features will be represented as components of a feature vector f. Two types of feature vectors are used by this invention, and their detail description will be provided later herein. The feature vector f is populated with components based on the $C_i$'s at step 108.

The feature vector f is used in a fusion rule applied at step 110. The fusion rule can be based on a "linear decision rule" defined as:

If z>H, then the object is declared mine-like;
otherwise, the object is declared non-mine-like. In this rule, $$z = w'f \quad (5)$$

where z is the fusion output score, w is the fusion coefficient column vector and w' is the transpose of the fusion coefficient column vector, f is the feature column vector, and H is a fusion detection threshold.

The fusion output score z is indicative of a mine-like object whenever the rule (z>H) is satisfied, whereas the fusion output score z is indicative of a non-mine-like object whenever the rule (z>H) is not satisfied.

As is known in the art, H can be varied to generate a receiver operator characteristics curve (ROC) which displays the probability of correct detection versus the probability of a false alarm. The probability of correct detection is the number of mine-like objects detected divided by the total number of mine-like objects. The probability of a false alarm is the number of non-mine-like objects detected divided by the total number of non-mine-like objects.

In the art, z=w'f is referred to as "linear decision score" because z is formed by a weighted, linear sum of the components of the feature vector f where the components of w are the weights. The components of w can be determined in a number of ways. For this invention, w is determined by maximizing the Fisher discrimination ratio (FDR) where $$= \frac{w'[f_{mean}(\text{mine}-\text{like}) - f_{mean}(\text{non}-\text{mine}-\text{like})}{w'[f_{cov}(\text{mine}-\text{like}) + f_{cov}(\text{non}-\text{mine}-\text{like})} \quad (6)$$

where $f_{mean}$ (mine-like) is the mean of feature vector f over a given training set of mine-like objects, $f_{mean}$ (non-mine-like) is the mean of feature vector f over a given training set of non-mine-like objects, $f_{cov}$ (mine-like) is the covariance matrix of feature vector f over the given training set of mine-like objects, and $f_{cov}$ (non-mine-like) is the covariance matrix of feature vector f over the given training set of non-mine-like objects.

The well known solution for w that maximizes the FDR is $$= \frac{[f_{mean}(\text{mine}-\text{like}) - f_{mean}(\text{non}-\text{mine}-\text{like})]}{[f_{cov}(\text{mine}-\text{like}) + f_{cov}(\text{non}-\text{mine}-\text{like})]} \quad (7)$$

Two types of feature vectors that can be constructed/used in the present invention are referred to herein as the "Simple-Confidence" feature vector and the "Group-Confidence" feature vector. The Simple-Confidence feature vector is an N-dimensional vector whose components are the N normalized output scores $C_1, \ldots, C_N$ associated with the group detection. For each i-th D/C scheme's algorithm, which did not detect the object, a $C_i$ value of 0 is used. While this choice of feature vector provides computational simplicity, it has drawbacks. Specifically, $C_i$ will contribute identically to the fusion output score z regardless of what other algorithms may have detected the same object. To illustrate this problem, consider the following example. When an object is detected only by Algorithm 1, it is intuitive that $C_1$ should not be emphasized in the same way, as it is when the object is detected also by Algorithms 2 and 3. In this latter instance, $C_1$ should have a much stronger influence on the fusion decision, i.e., $C_1$ should be given a greater weight. Thus, a configuration of the feature vector f that accounts for such weighting must account for the group to which a detection belongs.

The Group-Confidence feature vector addresses the above-described problem as will best be appreciated from the following example. Using the 3-algorithm example, the structure of the Group-Confidence feature vector is defined by the following 19-dimensional vector (in transpose format):

$f_{1:2}=[C_1, 1]$ for GROUP 1, otherwise [0, 0]
$f_{3:4}=[C_2, 1]$ for GROUP 2, otherwise [0, 0]
$f_{5:6}=[C_3, 1]$ for GROUP 3, otherwise [0, 0]
$f_{7:9}=[C_1, C_2, 1]$ for GROUP 4, otherwise [0, 0, 0]
$f_{10:12}=[C_1, C_3, 1]$ for GROUP 5, otherwise [0, 0, 0]
$f_{13:15}[C_2, C_3, 1]$ for GROUP 6, otherwise [0, 0, 0]
$f_{16:19}=[C_1, C_2, C_3, 1]$ for GROUP 7, otherwise [0, 0, 0, 0]

Generalization from this 3-algorithm example to the N-algorithm case is transparent. That is, in general, the dimension of the Group Confidence feature vector required to account for the various group permutations is $$2^N + N(2^{N-1}) - 1 \qquad (8)$$

The Group Confidence feature vector approach adjusts the fusion coefficients w depending on a detection's group affiliation. For example, using the 3-algorithm example, the fusion coefficient for $C_1$ in a GROUP 1 detection is $w_1$; the fusion coefficient for $C_1$ in a GROUP 4 detection is $w_7$; the fusion coefficient for $C_1$ in a GROUP 5 detection is $w_{10}$; and the fusion coefficient for $C_1$ in a GROUP 7 detection is $w_{16}$.

The inclusion of a "1" with each group is used to modify the threshold H depending on the detection's group affiliation. For example, suppose an object was detected by Algorithms 1 and 2 only, so that, by definition, $f_{1:6}$ and $f_{10:19}$ are all zero. Therefore, comparing z=w'f to threshold H is equivalent to comparing $[w_1 C_1 + w_8 C_2]$ to a threshold $[H_9-w]$. Thus, for each fusion rule application, the effective threshold is adjusted by the fusion coefficient of 1 for each group affiliation.

The advantages of the present invention are numerous. Tests of the present invention have shown that false alarm detection rates are reduced as outputs of multiple D/C schemes are fused. The present invention allows the best detections from each scheme to be fused so that only the most likely "mine-like" detections are presented at the end of the fusion process.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of fusing outputs from multiple detection/classification (D/C) schemes, comprising the steps of:
    providing output scores from each of a plurality of D/C schemes for an area of interest, each of said output scores corresponding to a known location in said area of interest and indicating a degree of confidence with respect to a detection of a target at said known location;
    normalizing said output scores to form normalized output scores associated with each of said plurality of D/C schemes; and
    fusing said normalized output scores for each said detection having at least one of said normalized output scores from said one of said plurality of D/C schemes associated therewith in accordance with a fusion rule, wherein said step of fusing comprises the steps of
    (i) selecting said fusion rule to be a linear decision rule defined by $w'f > H$ where w is a fusion coefficient vector and w' is a transpose of said fusion coefficient vector,
        f is a feature vector defined by said normalized output scores associated with each said detection, and
        H is a selected threshold value based on training data; and
    (ii) determining said fusion coefficient vector w associated with each said feature vector in accordance with the optimization of a Fisher Discriminant ratio.

2. A method according to claim 1 wherein said normalized output scores range from 0 to 1.

3. A method according to claim 1 wherein, for each i-th one of said plurality of D/C schemes, said output scores $P_i$ range from 0 to a maximum value $P_{imax}$, and wherein said step of normalizing comprises the step of assigning a normalized output score $C_i$ equal to $$\frac{P_i}{P_i + K(P_{iMAX} - P_i)}$$

where $$K = \frac{T_i}{P_{iMAX} - T_i},$$

and where $T_i$ is defined such that $Pd_i(T_i)=A$, wherein $Pd_i(x)$ is a probability detection function associated with said i-th one of said plurality of D/C schemes and A is a specified value between 0 and 1 for all of said plurality of D/C schemes.

4. A method according to claim 1 wherein, for each i-th one of said plurality of D/C schemes, said output scores $P_i$ range from 0 to a maximum value $P_{imax}$, and wherein said step of normalizing comprises the step of assigning a normalized output score $C_i$ equal to $$\frac{1 - Pd_i(P_i)}{1 - Pd_i(P_i) + KPd_i(P_i)}$$

where K=(1−A)/A,
    A is a specified value between 0 and 1 for all of said plurality of D/C schemes, and
    $Pd_i(x)$ is a probability detection function associated with said i-th one of said plurality of D/C schemes.

5. A method according to claim 1 wherein said plurality of D/C schemes comprises N D/C schemes, said method further comprising the steps of:
    assigning said normalized output scores for each said detection to one of $(2^N - 1)$ groups, wherein each of said $(2^N - 1)$ groups indicates which of said N D/C schemes had an output score indicative of said detection at said known location; and
    weighting said feature vector f for said step of fusing in accordance with which of said $(2^N - 1)$ groups is associated with said detection.

6. A method of fusing outputs from multiple detection/classification (D/C) schemes, comprising the steps of:
   providing output scores from each of a plurality of D/C schemes for an area of interest, each of said output scores corresponding to a known location in said area of interest and indicating a degree of confidence with respect to a detection of a target at said known location;
   normalizing said output scores to form normalized output scores associated with each of said plurality of D/C schemes;
   categorizing each of said normalized output scores into a group based on said known location associated therewith; and
   fusing said normalized output scores for each said group in accordance with a fusion rule, wherein said step of fusing comprises the steps of
   (i) selecting said fusion rule to be a linear decision rule defined by $w'f > H$ where w is a fusion coefficient vector and w' is a transpose of said fusion coefficient vector,
   f is a feature vector defined by said normalized output scores associated with each said detection, and
   H is a selected threshold value based on training data; and
   (ii) determining said fusion coefficient vector w associated with each said feature vector in accordance with the optimization of a Fisher Discriminant ratio.

7. A method according to claim 6 wherein said normalized output scores range from 0 to 1.

8. A method according to claim 6 wherein, for each i-th one of said plurality of D/C schemes, said output scores $P_i$ range from 0 to a maximum value $P_{imax}$, and wherein said step of normalizing comprises the step of assigning a normalized output score $C_i$ equal to $$\frac{P_i}{P_i + K(P_{iMAX} - P_i)}$$

where $$K = \frac{T_i}{P_{iMAX} - T_i},$$

and where $T_i$ is defined such that $Pd_i(T_i) = A$, wherein $Pd_i(x)$ is a probability detection function associated with said i-th one of said plurality of D/C schemes and A is a specified value between 0 and 1 for all of said plurality of D/C schemes.

9. A method according to claim 6 wherein, for each i-th one of said plurality of D/C schemes, said output scores $P_i$ range from 0 to a maximum value $P_{imax}$, and wherein said step of normalizing comprises the step of assigning a normalized output score $C_i$ equal to $$\frac{1 - Pd_i(P_i)}{1 - Pd_i(P_i) + KPd_i(P_i)}$$

where $K = (1-A)/A$,
A is a specified value between 0 and 1 for all of said plurality of D/C schemes, and
$Pd_i(x)$ is a probability detection function associated with said i-th one of said plurality of D/C schemes.

* * * * *